Sept. 20, 1932.  F. C. HASSE ET AL  1,878,136
WELDING MACHINE
Filed Sept. 28, 1927    6 Sheets-Sheet 1

INVENTORS:
Franklin C. Hasse,
Samuel R. Oldham,
BY
Byrne, Townsend & Brickenstein,
ATTORNEYS.

Sept. 20, 1932.   F. C. HASSE ET AL   1,878,136
WELDING MACHINE
Filed Sept. 28, 1927   6 Sheets-Sheet 4
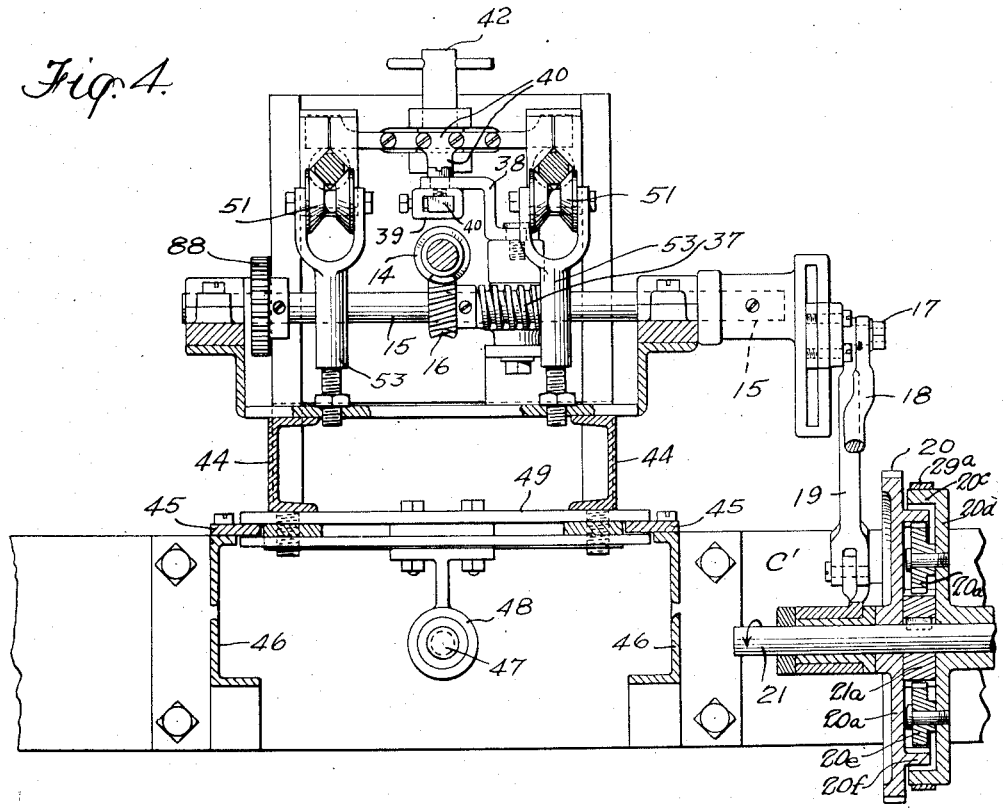
Fig. 4.
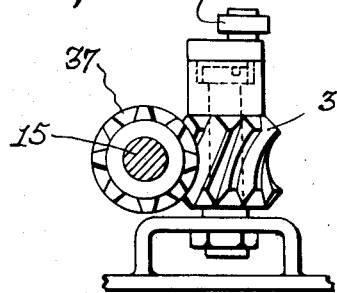
Fig. 4ª.
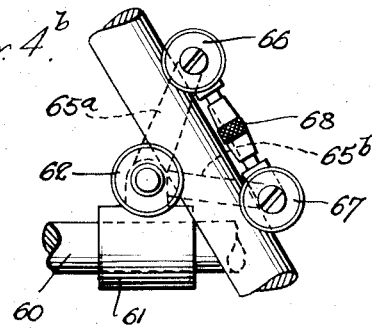
Fig. 4ᵇ.
INVENTORS:
Franklin C. Hasse,
Samuel R. Oldham,
BY
Byrne Townsend & Brickenstein
ATTORNEYS.

Sept. 20, 1932.   F. C. HASSE ET AL   1,878,136
WELDING MACHINE
Filed Sept. 28, 1927   6 Sheets-Sheet 5

INVENTORS:
Franklin C. Hasse
Samuel R. Oldham,
BY
Byrne Townsend & Brickenstein,
ATTORNEYS.

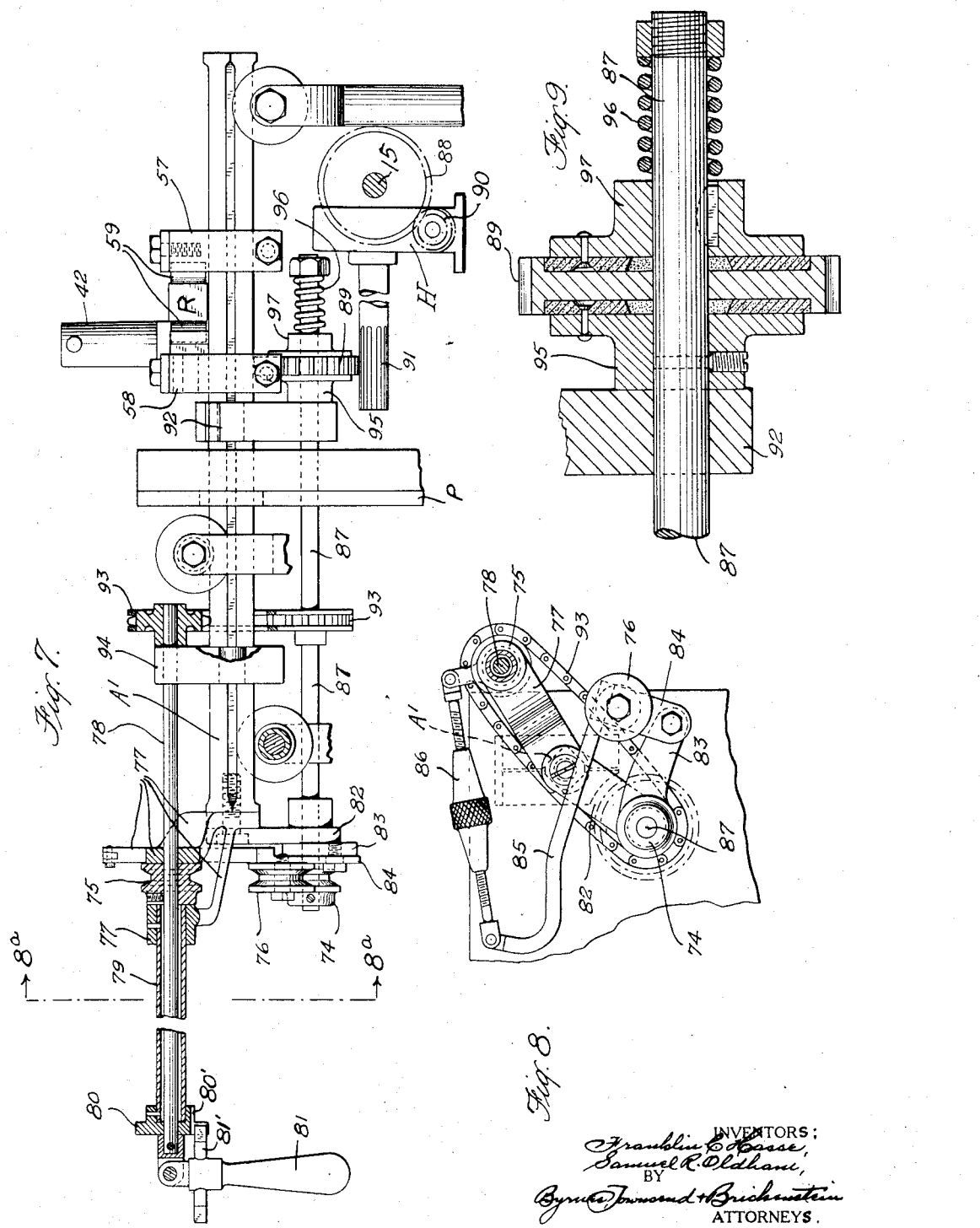

Patented Sept. 20, 1932

1,878,136

UNITED STATES PATENT OFFICE

FRANKLIN C. HASSE, OF CHICAGO, AND SAMUEL R. OLDHAM, OF LA GRANGE, ILLINOIS, ASSIGNORS TO THE OXWELD RAILROAD SERVICE COMPANY, A CORPORATION OF DELAWARE

WELDING MACHINE

Application filed September 28, 1927. Serial No. 222,580.

This invention relates to welding apparatus especially of the automatic type and has for its object to provide a machine for automatically and efficiently performing welding operations generally, and in particular, for building up worn metal surfaces.

Another object is to safe-guard the actuating mechanism from the heat.

Another object is to facilitate the operation and adjustment of the various parts before or during welding.

In numerous industries it is desirable for economy to renew worn equipment by building up worn surfaces with suitable metal fused and replaced by the aid of a high temperature heating element, such for example as the electric arc, or the oxy-acetylene blowpipe. Whether the welding operation is automatic or not, it is desirable at times to change some of the various adjustments during operation without interruption and without forsaking precision. In this invention all such adjustments are made possible from the operator's position at the front of the machine and the driving motor for the actuating mechanism is protected by a plate through which the supporting and feeding mechanisms for a weld strip and blow-torch passes.

The novel features will be more clearly brought out in the following description and drawings wherein:

Fig. 4 is a section on the line 4a—4a of Fig. 1.

Figs. 4a and 4b are detail views.

Fig. 7 is a section on the line 7a—7a of Fig. 1.

Fig. 8 is a section on the line 8a—8a of Fig. 7.

Fig. 9 is a detail showing the construction of a transmission gear.

Figure 1:
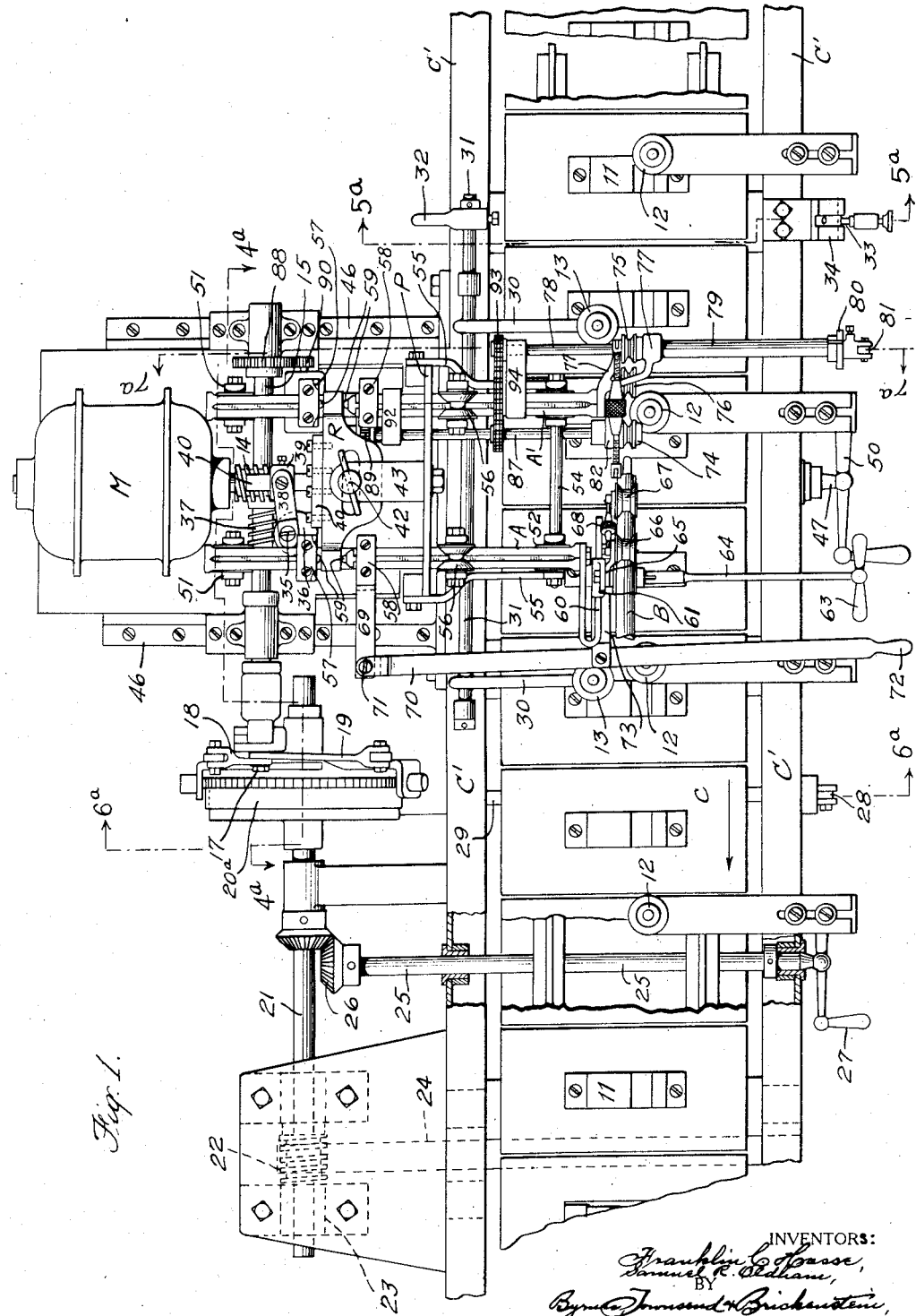
Fig. 1 is a top plan view of an embodiment of this invention.

This machine comprises a frame C' in which are journalled the sprockets K, K' over which passes the endless work carrier C consisting of a series of similar elements having substantially flat outer faces and pivotally connected after the manner of links in a chain. The frame supports the upper flight of the carrier, thus providing a level travel for the work during welding. The electric motor M drives the work carrier through the transmission mechanism shown for controlling movement of the work carrier. The motor M also oscillates the rocker arm R which in turn oppositely moves the arms A, A'. At the outer ends of these arms are carried the blow-torch B and weld or filler strip F. Suitable mechanism feeds the filler strip to the weld as the strip and blow-torch move back and forth across the work. The plate P supports the arms A, A' and their mechanism and also shields the motor M from the welding heat.

On the work carrier C are a number of removable lugs 11 for clamping and positioning the work. In addition guide rollers 12 may be mounted on one side of the work and adjusted transversely of the work carrier so that they will be moved into contact with the work. On the opposite side of the work are other guide rollers 13 which operate in a manner to be later described.

The worm 14 on the motor shaft drives the shaft 15 through the gear 16 for actuating both the work carrier and the blow-torch and weld strip. For driving the work carrier motion is transmitted from the shaft 15 through the crank pin 17 to the connecting arms 18 and 19 to the ends of which are attached pawls 18' and 19' engaging the ratchet teeth 20 on the periphery of plate 20a loosely mounted on the shaft 21 so that motion is transmitted from the shaft 15 to the shaft 21 and thence through the worm 22 and worm-wheel 23, shown in Fig. 3, to the sprocket K driving the work carrier C; both wheel 23 and sprocket K being mounted on shaft 24.

Figure 6:
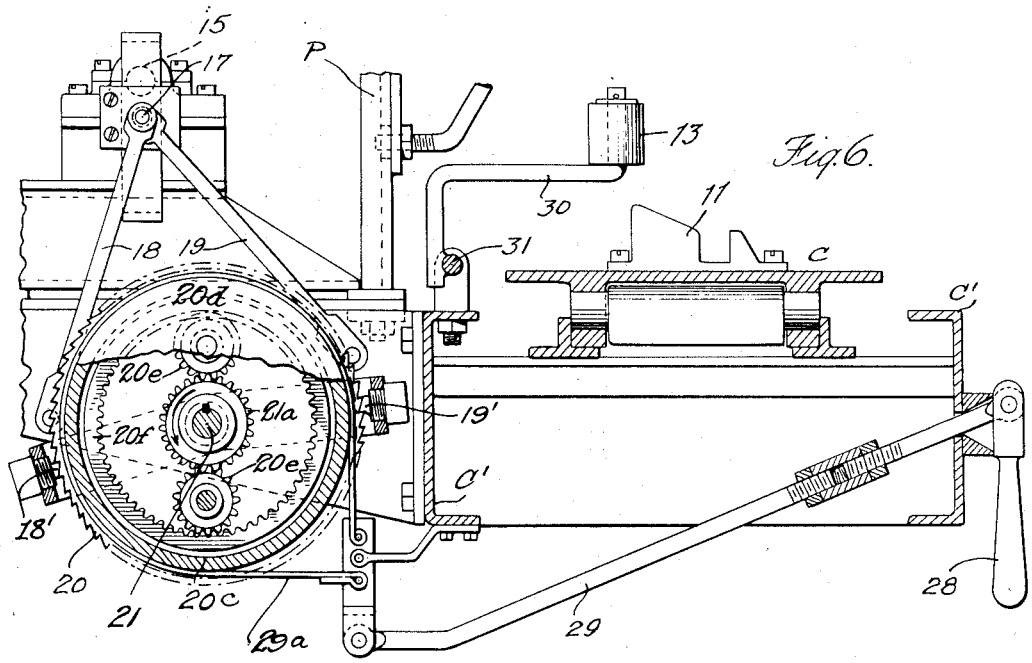
Fig. 6 shows a portion of the mechanism for controlling travel of the work carrier.

For manually moving the work carrier, the handle 27 on shaft 25 actuates the bevelled gears 26 keyed to the shafts 25 and 21. The handle 28 also on the front of the machine is connected by the rod 29 to the brake band 29a on the drum 20c at the periphery of a plate 20d also loosely mounted on the shaft 21; as shown in Fig. 4. To permit manual control of the work carrier through handle 27 while the motor 17 is running, any suitable mechanism may be provided. As shown in Figs. 4 and 6, a gear 21a is keyed to shaft 21 and meshes with pinions 20e carried by the plate 20d. The pinions 20e also mesh with an internal gear 20f carried by plate 20a. The work carrier C is motor driven by setting the handle 28 to tighten the band 29a on the drum 20c; and said work carrier may be moved manually by turning handle 27 and without stopping the motor, by operating the handle 28 to release the band 29a.

Figure 5:
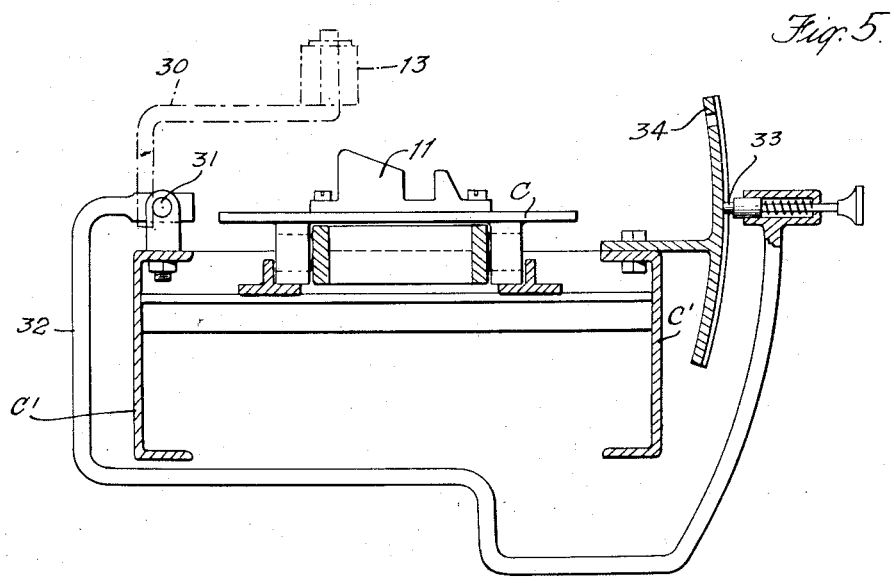
Fig. 5 is a detail showing the controlling mechanism for the guide rollers.

As shown in Fig. 5 guide roller 13 is mounted on its support 30 projecting from the rock shaft 31 from which also projects the portion 32 extending beneath the frame of the machine and around to the spring pressed pin 33 which engages the hole shown at the top of the quadrant 34 to hold the guide rollers 13 raised in inoperative position. Preferably the rollers 13 are yieldingly held against the work by the weight of the extension portion 32.

Figure 3:
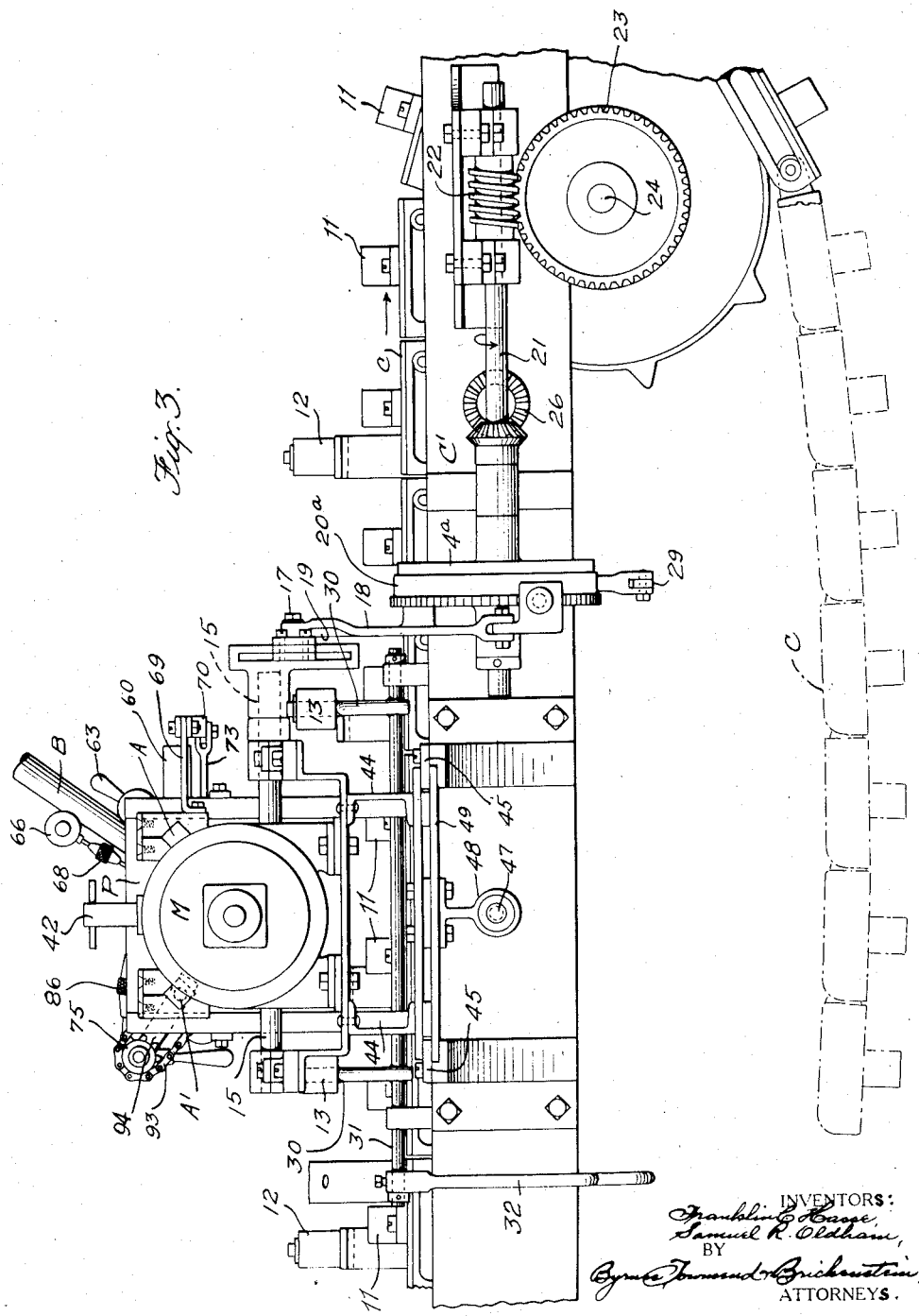
Fig. 3 is a rear side view of the device of Fig. 1.

For transmitting motion from the shaft 15 to the arms A, A' the crank pin 35 on the worm gear 36 is rotated by engagement with the worm 37 on the shaft 15 and a link 38 transmits the motion to the collar 39 on the projection 40 of the rocker arm R. The collar 39 is adjustable along the projection 40 so as to adjust amplitude of movement of the rocker arm which oscillates about the pivot pin 42 held in bracket 43 secured to the supporting plate P, as shown in Figs. 3 and 4. Pin 42 is of square cross section where it passes through the slot shown in the arm R. The motor M and supporting plate P are mounted on channels 44 arranged transversely of the machine frame. Beneath these channels are arranged guides to slide on the support 45 mounted on transverse channels 46 projecting from the machine frame and actuated by adjusting screw 47 engaging the nut 48 secured to the slide 49 for moving the motor, plate P and all actuating mechanism for the blow-torch and weld strip. The handle 50 on the screw 47 permits simultaneous transverse adjustment of both the blow-torch and weld strip in this manner. For supporting arms A and A' rollers 51 are arranged in the rear of the machine and other rollers 52 under the forward portion of these arms A and A', as shown in Figs. 1, 4, and 7. Supporting rollers 51 are mounted in forked columns 53 as shown in Fig. 4, while rollers 52 are supported by braces 55 connected by the transverse member 54 as shown in Fig. 1. Additional guide rollers 56 are placed over the arms A and A'. Clamp blocks 57 and 58 are secured to the arms A and A' behind and in front of the rocker arm R. Rollers 59 project from each clamp block and engage the rocker arm so as to move each arm A and A' back and forth without any lost motion, as shown in Fig. 7.

Carried at the forward end of arm A is the supporting track 60 carrying a slide 61 adjustable longitudinally of the work carrier for moving the blow-torch B supported thereon. The grooved wheel 62 engages the underside of the blow-torch for raising or lowering the same and is rotated through the extension 64 at the front end of which is located the handle 63. Also secured to the adjustable slide 61 is the support 65 for the grooved wheels 66 and 67 which engage the opposite side of the blow-torch from grooved wheel 62, the latter bearing against the torch at a point about midway between the bearing points of rollers 66 and 67. The support 65 is in two parts 65a, 65b each pivoted to the adjustable slide 61 and each carrying one of the wheels 66 and 67. A turnbuckle 68 controls the spacing of the wheels 66 and 67 and therefore controls the degree of clamping pressure exerted by these wheels upon the blow-torch. To control the position of the slide 61 and blow-torch on track 60, an arm 70 is pivotally mounted at 71 on the projection 69 secured to the clamp block 58 on the arm A and is provided at its forward end with a handle 72, a link 73 pivotally connecting the arm 70 and the adjustable slide 61.

Figure 2:
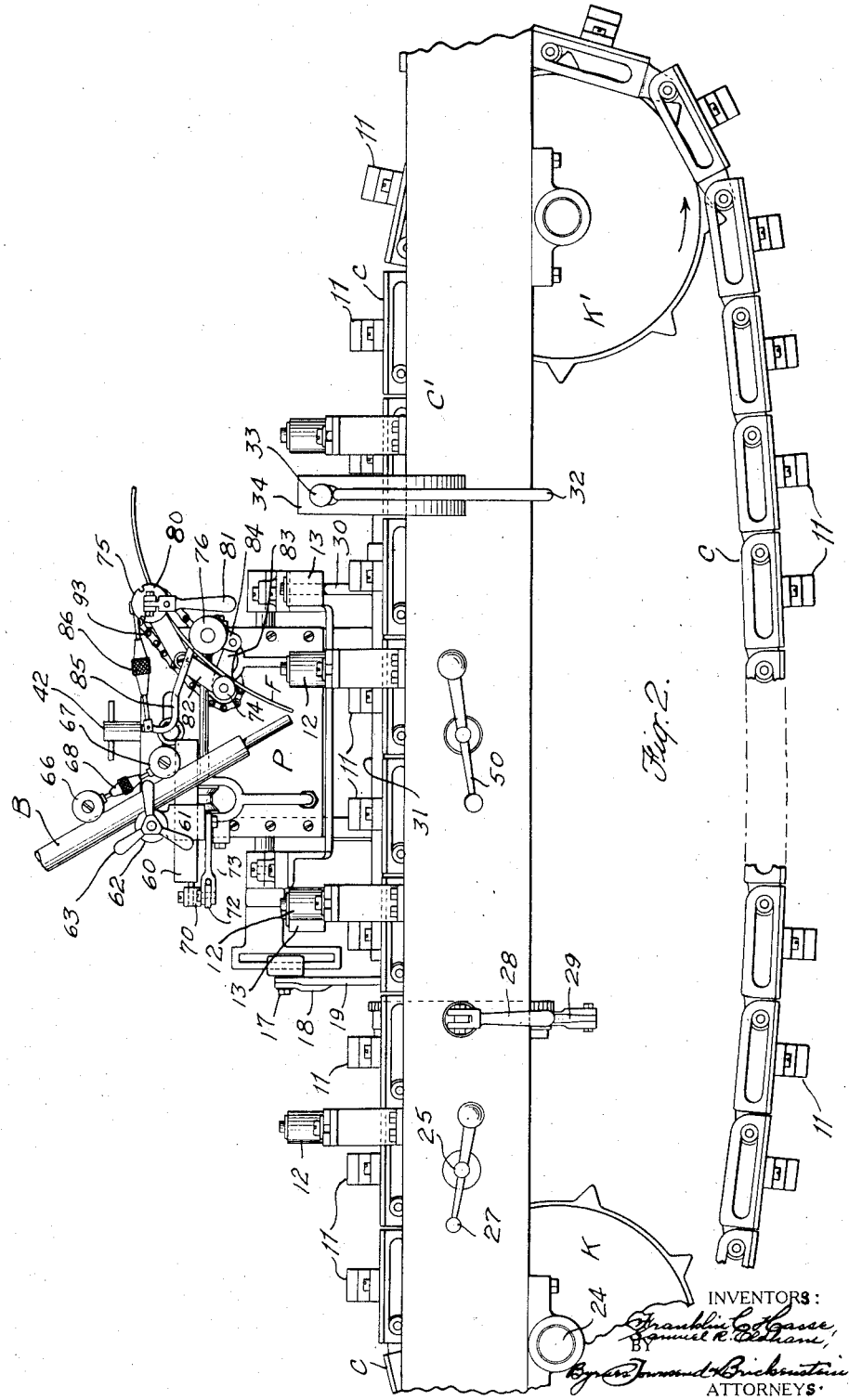
Fig. 2 is a front side view of the device of Fig. 1.

For feeding and guiding the weld strip, driven rollers 74 and 75 engage the upper portion of the strip, while an idler roller 76 engages the other side of the strip about midway between the rollers 74 and 75 and all three rollers are mounted at the forward end of the arm A'. A support 77 extends from the forward end of the arm A' to the rotatable shaft 78 and stationary sleeve 79. A clutch 80 controlled by the handle 81 located at the forward end of the sleeve 79 connects shaft 78 with sleeve 79 so as to lock rollers 74 and 75 against rotation. The supporting connection 82 extends between the front end of arm A' and shaft 87 carrying roller 74. The arm 83 carried by connection 82 has pivoted at its outer end supporting link 84 carrying the roller 76. Extending from the upper end of link 84 is the integral projection 85 as shown in Figs. 2 and 8 and a turnbuckle 86 connects the upper end of projection 85 with the upper end of support 77. By adjusting turnbuckle 86 the roller 76 is caused to press more tightly against the filler strip F and also vary the distance of the lower end of the strip from the blow-torch in a direction longitudinally of the travel of the work carrier.

The mechanism for driving the weld strip feed rollers 74 and 75 is through shaft 87 by means of a gear 88 keyed on the shaft 15 which in turn engages a gear 90 from which motion is transmitted by a worm gear reducing unit H to the shaft carrying elongated gear 91 shown in Fig. 7 and with which meshes gear 89 on shaft 87. As shown in Fig. 7 this shaft is supported from the arm A' by means of the clamp block 92 containing bearing for the shaft 87. A chain 93 engages gears on shafts 87 and 78 and thus rotates shaft 78 which in turn is supported by another clamp block 94 having a bearing therein for the shaft 78. Motion of the arm A' back and forth under the influence of the rocker arm causes shafts 87 and 78 to both move back and forth as does also the gear 89, but since the driving gear 91 is elongated there is no possibility of the gears 91 and 89 getting out of mesh. Gear 89 is not keyed on shaft 87 but is frictionally pressed against collar 95 which is fixed on shaft 87. The spring 96 cooperating with the nut illustrated on shaft 87 and also with the collar 97 causes gear 89 to drive the shaft 87 under normal conditions, but when clutch 80 locks shafts 78 against rotation, and shaft 87 and the weld strip also stop, then the gear 89 slips on the shaft 87 under friction.

It will be noted that the rollers 74 and 75 are driven from shaft 15 through gears 88 and 90, driven by shaft 15 (see Figs. 1 and 7); and the worm gear reducing unit H driven by gear 90 is arranged to drive elongated pinion 91. Shaft 78 is driven by chain and sprocket drive 93 from shaft 87 which carries gear 89 that meshes with pinion 91 (see Fig. 7). Accordingly, when a finger 81' on the swingable handle 81 engages a notch 80' in clutch 80, shafts 78 and 87 are locked against rotation, and gear 89 (see Figs. 7 and 9) slips and continues to be driven by pinion 91 and to rotate between friction collars 95 and 97. The welding rod or strip F can be raised clear of the work and locked in that position by turning handle 81 in a direction contrary to the direction of rotation of shafts 78 and 87 and then engaging a finger 81' of handle 81 with a notch 80' in clutch 80. The main function of the drive assembly shown in Figs. 7 and 9 is to provide a constant pressure on the welding rod or strip against the work being welded and to properly feed the strip to the weld as the strip is fused. Gear 89 rotates at a constant speed, but the shafts 87 and 78 turn only when the welding strip is being fed into the weld and melted; and the gear 89 may continue rotating and slip between the friction collars 95 and 97 when the shafts 87 and 78 are held against rotation. This mechanism for feeding the welding strip or rod allows for a wide range of melting rate of the strip, permitting the use of various sizes of strip or rod, various sizes of welding flame, and various welding speeds.

In operation the motor is started after the work has been properly adjusted on the carrier C. If it is found desirable to slowly and manually move the carrier this is accomplished by rotation of the handle 27 when the clutch controlled by the handle 28 is out. The guide rollers 12 are each manually adjusted transversely of the work and the guide rollers 13 on the opposite side of the work are engaged with the work. After turning the handle 63 to adjust the blow-torch to the desired height and moving handle 72 to adjust the blow-torch to the desired position longitudinally of the carrier travel, the feeding mechanism for the blow-torch and weld strip is then adjusted forward or backward by the handle 50 until in the desired position over the work. Adjustment of the turn-buckle 68 serves to increase the clamping action of the rollers on the blow-torch, if desired. By means of the handle 81 releasing clutch 80, the rollers 74 and 75 are positively driven and the weld strip is then fed by both rollers. On starting the motor after making the necessary adjustments of the work carrier, blow-torch and weld strip, the blow-torch is automatically moved back and forth across the work as is the weld strip but in opposite phase thereto.

An advantage of this machine resides in the convenience of adjustment by reason of all the adjustments being made from the operator's position at the forward side of the machine.

Another advantage is the use of the supporting plate P which not only supports the actuating mechanism for the blow-torch and weld strip, but also serves to protect the motor M from the heat of the weld. If desired the plate P may be of larger area extending a greater distance both up and down and to each side.

The operation of the machine will be apparent from the foregoing description. While the machine is primarily designed for applying weld metal to worn surfaces such as splice bars, it will be understood other classes of welding operations may be performed in the machine. Also, while an oxy-acetylene blowpipe as is shown is the preferred heating means, it will be understood that the machine may be employed in welding operations utilizing the electric arc; and certain features of the machine may also be utilized in the cutting of metals by substituting an oxy-acetylene cutting blowpipe for the welding blowpipe shown. Various other changes in details of construction may be made in the machine illustrated without departing from the precept of the invention.

What is claimed is:

1. In a welding machine, the combination of means for heating the work, a movable arm, said heating means being mounted on one end of said arm, mechanism connected to the other end of said arm to operate the latter, and a support for said arm and mechanism, said support being arranged to shield said mechanism and the adjoining end of said arm from said heating means.

2. In a welding machine, the combination of means for heating the work, a movable member carrying such heating means, and mechanism for operating said member, and a support for said member and mechanism, said support arranged to shield said mechanism from said heating means and comprising a vertical plate disposed between said heating means and said mechanism.

3. In a welding machine, the combination of a blowpipe, a guide for welding material, movable members carrying said blowpipe and said guide, mechanism for operating said members, and a vertical supporting plate for said members between said blowpipe and said mechanism.

4. The invention defined in claim 3, wherein said plate has openings therethrough in which said members are slidably mounted.

5. In a welding machine, the combination of a work support, means for heating work on said support, means for feeding weld metal to the part of the work heated by such heating means, mechanism for moving said support and heating means relatively to one another, means for reciprocating said heating means transversely of the work during such movement, driving means for said mechanism and such reciprocating means, and a vertical plate between said driving means and said heating means supporting the latter in operative relation to the work.

6. In apparatus of the class described, the combination of a movable endless carrier having elements providing a substantially level work support, a blowpipe, a fixed support adjacent one longitudinal edge of said carrier, a movable member on said support for mounting said blowpipe over said carrier, and mechanism for operating said carrier and said member.

7. The invention claimed in claim 6, wherein said fixed support comprises an adjustable vertical plate adapted to shield part of said mechanism from the heat from said blowpipe.

8. Welding apparatus comprising the combination of a support, movable arms carried thereby, a blowpipe carried by one of said arms and weld metal carried by the other, a rocker connected to said rods, and mechanism for operating said rocker.

9. Welding apparatus according to claim 8, wherein said support comprises a vertical plate and said arms are mounted in openings in said plate.

10. Welding apparatus according to claim 8, wherein said support comprises a vertical plate, said rocker is mounted on one side of said plate, and said blowpipe is disposed on the other side of the plate.

11. Welding apparatus according to claim 8, wherein said rods are slidable and move in parallel paths.

12. Welding apparatus according to claim 8, wherein said support comprises a vertical plate, said arms are parallel and slidably mounted in openings through said plate, and said rocker is pivoted on said plate and moves said arms in opposite directions.

13. Welding apparatus comprising the combination of a blowpipe, a guide for weld metal, a pivoted rocker connected to said blowpipe and to said guide, and mechanism for operating said rocker whereby said blowpipe and guide are moved simultaneously but in opposite directions.

14. Welding apparatus comprising the combination of a work support, a plate mounted alongside said support, means whereby said plate and said support are relatively movable lengthwise of the work, a blowpipe, means for guiding weld metal to the work heated by said blowpipe, and rods extending through said plate and supporting said blowpipe and such guiding means.

15. Welding apparatus comprising the combination with a heating element, of supporting means therefor, means for actuating said supporting means to move the heating element back and forth across the work, means carried by said supporting means for moving the heating element longitudinally of the work, and means carried by said longitudinally moving means for raising and lowering the heating element during use.

16. Welding apparatus comprising the combination with a heating element; of supporting means therefor; means for actuating said supporting means to move the heating element back and forth across the work; means carried by said supporting means for moving the heating element longitudinally of the work; and means carried by said longitudinally moving means for raising and lowering the heating element during use; said actuating means, longitudinal moving means for the heating element, and the raising and lowering means all being constructed to be controlled by the operator from a position at the front of the machine.

17. Welding apparatus comprising the combination with a heating element, of supporting means therefor comprising spaced rollers clamping the heating element between them, means for adjusting the clamping action of said rollers, means connected to at least one of the rollers for raising and lowering the heating element, and means for moving said supporting means to move the heating element relative to the work, either longitudinally or transversely thereof.

18. Welding apparatus comprising the combination with a heating element, of supporting means therefor, a weld strip, supporting and actuating means for the strip comprising spaced rollers, at least one of which is adjustable transversely of the strip to control the position of the end of the strip with respect to the heating element.

19. Welding apparatus comprising the combination with a heating element, of supporting means therefor, a weld strip, supporting and actuating means for the strip, means for reciprocating the heating element and strip across the work, means for moving the heating element and strip longitudinally with respect to the work, and means for simultaneously adjusting both the heating element and strip together with the supporting means of each.

20. Blowpipe apparatus comprising the combination of a work conveying carrier; a blowpipe; means for actuating said blowpipe relatively to work on said carrier; a support for said blowpipe and such actuating means adjustable relatively to said carrier; and means for adjusting said support.

21. Welding apparatus comprising the combination of a work carrier, and mechanism to feed welding rod to work on said carrier, said mechanism comprising a driving device, a driven device, and means operative to enable said driven device to discontinue operating without stopping said driving device.

22. Welding apparatus according to claim 21, wherein said means comprises a friction connection between said devices adapted to permit slippage of one of the devices relatively to the other.

23. Welding apparatus comprising the combination of a work carrier; mechanism for feeding welding strip or rod to work on said carrier; a continuously-operating device for driving said mechanism; and means whereby the feed of such strip or rod is variable while said device is operating.

24. Torch holding and adjusting mechanism comprising a pair of rollers adapted to bear against the same side of a torch; and a third roller adapted to bear against the other side of said torch at a point about midway between the bearing points of said pair of rollers.

25. Torch holding and adjusting mechanism according to claim 24, in which said pair of rollers are adjustable toward and away from one another, to control the degree of clamping pressure exerted by said rollers upon said torch.

26. Torch holding and adjusting mechanism according to claim 24, in combination with means for propelling a torch in either direction lengthwise of its axis and relatively to said rollers.

27. Torch holding and adjusting mechanism according to claim 24, in which each of said rollers is grooved, and the rollers of said pair of rollers are connected by a turnbuckle adapted to adjust them toward or away from one another to vary the clamping pressure exerted by said rollers upon the torch.

In testimony whereof, we affix our signatures.

FRANKLIN C. HASSE.
SAMUEL R. OLDHAM.